United States Patent
Itoh et al.

(10) Patent No.: US 6,927,817 B2
(45) Date of Patent: Aug. 9, 2005

(54) LIQUID CRYSTAL DISPLAY DEVICE, METHOD FOR MANUFACTURING THE SAME, AND ELECTRONIC APPARATUS

(75) Inventors: Tomoyuki Itoh, Okaya (JP); Tokuro Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 10/647,209

(22) Filed: Aug. 26, 2003

(65) Prior Publication Data

US 2004/0095530 A1 May 20, 2004

(30) Foreign Application Priority Data

Aug. 27, 2002 (JP) ........................................ 2002-247159

(51) Int. Cl.[7] ...................... G02F 1/1368; G02F 1/1343
(52) U.S. Cl. ........................... 349/113; 349/39; 349/187
(58) Field of Search ............................... 349/38, 39, 43, 349/113, 114, 139, 143, 187; 438/30

(56) References Cited

U.S. PATENT DOCUMENTS

| 2003/0063244 A1 * | 4/2003 | Fujimori et al. ............. 349/113 |
| 2003/0231267 A1 * | 12/2003 | Murai et al. ................. 349/113 |
| 2004/0032552 A1 * | 2/2004 | Kim ........................... 349/113 |

FOREIGN PATENT DOCUMENTS

| JP | A 10-311982 | 11/1998 |
| JP | A 11-242226 | 9/1999 |
| JP | A 11-295762 | 10/1999 |
| JP | A 2000-162644 | 6/2000 |

* cited by examiner

*Primary Examiner*—Robert H. Kim
*Assistant Examiner*—Tai Duong
(74) *Attorney, Agent, or Firm*—Oliff & Berridge, PLC

(57) ABSTRACT

The invention provides a liquid crystal display device having a transmissive display region and a reflective display region in one dot region, and capable of obtaining a bright and high-contrast display in both a reflective display and a transmissive display. In particular, a liquid crystal display device according to the present invention can include a reflective display region and a transmissive display region provided in one dot region, and a reflection layer provided in the reflective display region. A pixel electrode, a TFT element for driving the pixel electrode, a capacitive electrode connected to the pixel electrode, an electrode part arranged to oppose the capacitive electrode via an insulating layer are formed in the dot region. Further, in the display regions within the dot region, the capacitive electrode or the capacitive line can be arranged at a position where it overlaps, in plan view, the inclined region between the reflective display region and the transflective display region.

12 Claims, 6 Drawing Sheets

LIQUID CRYSTAL DISPLAY DEVICE, METHOD FOR MANUFACTURING THE SAME, AND ELECTRONIC APPARATUS

BACKGROUND OF THE INVENTION

1. Field of Invention

The present invention relates to liquid crystal display devices and electronic apparatuses. More specifically, the invention relates to a construction of a transflective liquid crystal display device capable of performing display with sufficient brightness, in particular, even in a transmission mode.

2. Description of Related Art

A transflective liquid crystal display device which performs a display both in a reflective display mode and a transmissive display mode, can perform a clear display even in dark surroundings while reducing the power consumption by switching its display mode between the reflection mode and the transmission mode depending on the ambient brightness.

There has been proposed a transflective liquid crystal display device in which a liquid crystal layer is interposed between light transmissive upper and lower substrates, and a reflection film, which is made of a metal film such as aluminum and has light transmissive slits formed therein, is provided on the inner surface of the lower substrate, the reflection film functioning as a transflective reflection film. In this case, in the reflection mode, after external light incident from the upper substrate side passes through the liquid crystal layer, the light is reflected by the reflection film arranged on the inner surface of the lower substrate, and then the light passes through the liquid crystal layer again to be provided for display from the upper substrate side. On the other hand, in the transmission mode, after light from a backlight, which enters from the lower substrate side, passes through the liquid crystal layer via the slits formed in the reflection film, it can be provided from the upper substrate side for display. Accordingly, in the reflection film, the region where the slits are formed constitutes the transmissive display region, and the region where the slits are not formed constitutes the reflective display region.

Such a transflective liquid crystal display device performs a display, for example, in such a way that, when the thickness of the liquid crystal layer is constant, light passes through the liquid crystal layer twice in the reflective display region, but light passes through the liquid crystal layer only once in the transmissive display region.

In this way, in the reflective display region and the transmissive display region, the number of times that light passes through the liquid crystal layer is different from each other. However, the alignment control of liquid crystal molecules in the liquid crystal layer is carried out by applying an electric field to the liquid crystal in the same pixel so that it is difficult to obtain a high contrast display in both the transmissive display region and the reflective display region whose display manners are different from each other. For example, a conventional transflective liquid crystal display device has a problem that, when optimizing the luminance in the reflection mode, luminance in the transmission mode is insufficient.

Thus, for example, as disclosed in Japanese Unexamined Patent Application Publication No. 11-242226, there is proposed a transflective liquid crystal display device in which the thickness of a liquid crystal layer in a reflective display region and the thickness of the liquid crystal layer in a transmissive display region, in one dot region, are constructed differently to correct the length of optical path for every display mode, and thus to obtain a high bright display even in the transmissive display. FIG. 5 illustrates a cross-sectional structure of one dot region in a liquid crystal display device with the corresponding construction. A liquid crystal display device 100 shown in FIG. 5 includes a liquid crystal panel 101 and a backlight 160 arranged on the backside thereof. The liquid crystal panel 101 is constructed by interposing a liquid crystal layer between the upper substrate 120 and the lower substrate 110. The lower substrate 110 includes a transparent substrate 110A, a resin layer 112 partially formed on the substrate 110A at the liquid crystal layer side, a reflection layer 111 partially formed on the resin layer 112, a pixel electrode 113 covering the dot region in the drawing, and a polarizing plate 116 arranged on the outer surface of the substrate 11A. The upper substrate 120 includes a transparent substrate 120A, a counter electrode 123 formed on the substrate 120A at the liquid crystal layer side, and a polarizing plate 126 formed on the outer surface of the substrate 120A.

Also, the region of the lower substrate 120 in which the reflection layer 111 is formed constitutes the reflective display region 130, and in the dot region not including the reflective display region 130, the region where the pixel electrode 113 is formed constitutes the transmissive display region 140.

SUMMARY OF THE INVENTION

In the above liquid crystal display device 100, the reflection layer 111 is formed on the resin layer 112, whereby the thickness dr of the liquid crystal layer in the reflective display region 130 becomes thinner than the thickness dt of the liquid crystal layer in the transmissive display region 140. Thus, the device has an advantage that the optical path difference in between the regions can be adjusted to optimize the display luminance thereof. However, in the liquid crystal display device according to the above construction, as shown in FIG. 5, it is inevitable that an inclined part 170 is generated, due to the resin layer 112, between the reflective display region 130 and the transmissive display region 140. For this reason, there is a problem that leakage of light occurs due to disorder in alignment of liquid crystal molecules by the inclined part 170 and the contrast is not improved as much as expected. Further, FIG. 5 shows that an end of the reflection layer 111, which is provided on the resin layer 112, at the transmissive display region 140 side is arranged on the inclined part 170. In such an arrangement, the leakage of light can be reduced in the transmissive display, but the leakage of light occurs in the reflective display, and thus deteriorates the contrast. On the contrary, if the end of the reflection layer 111 is arranged not to reach the inclined part 170, the leakage of light occurs in the transmissive display, thereby deteriorating the contrast.

The present invention has been achieved in order to solve the above problems. Accordingly, an object of the present invention is to provide a transflective liquid crystal display device having a transmissive display region and a reflective display region in one dot region, and capable of achieving a bright and high-contrast display in both the reflective display and the transmissive display.

Another object of the present invention is to provide an electronic apparatus provided with the above liquid crystal display device.

The present invention can provide a transflective liquid crystal display device including a liquid crystal layer being interposed between an upper substrate and a lower substrate which oppose each other, a reflective display region and a transmissive display region provided in one dot region, the reflective display region and the transmissive display region having different liquid crystal layer-thicknesses, and a reflection layer provided in the reflective display region of the lower substrate. There can be provided in the dot region, a pixel electrode, a switching element for driving the pixel electrode, a capacitive electrode connected to the pixel electrode, a capacitive line arranged to oppose the capacitive electrode with an insulating layer therebetween, and an inclined region provided between the reflective display region and the transmissive display region, the thickness of the liquid crystal layer in the inclined region varying continuously. In the above liquid crystal display device, in the display regions within the dot region, an edge of the reflection layer at the transmissive display region side can be arranged outside the inclined region, and the capacitive electrode or the capacitive line can be arranged at a position where it overlaps the inclined region in plan view.

The liquid crystal display device of the above construction can include in one dot region, two display regions having different thicknesses of the liquid crystal layers therein, and the inclined region between these display regions where the thickness of the liquid crystal layer therein varies continuously. The inclined region where the thickness of the liquid crystal layer varies continuously is, for example, a region that is formed by the inclined edge portion of the resin layer formed correspondingly to the reflective display region in order to make the thickness of the liquid crystal layer in the reflective display region relatively thin. In the liquid crystal display device of the present invention, the reflection layer in the reflective display region is formed outside the inclined region to exclude the inclined region from the reflective display region, and the capacitive line or capacitive electrode can be arranged to overlap the inclined region in plan view to prevent light from entering the inclined region in the transmissive display, thereby excluding the inclined region even from the transmissive display region. Accordingly, any poor display portion resulting from the continuous variation in the thickness of the liquid crystal layer in the dot region is excluded from both the reflective display region and the transmissive display region. As a result, it is possible to obtain a high-contrast display with excellent visibility in both the reflective/transmissive displays.

Next, in the liquid crystal display device according to the present invention, it is preferable that the capacitive electrode or capacitive line be made of one or more types of materials selected from metal material (for example, Cr, Ta, Ti, Al, alloy thereof, and the like) or poly silicon. According to this construction, it is possible to obtain excellent light-shielding properties in the inclined region, and to obtain properties well suited for a storage capacitor of the pixel electrode.

Next, in the liquid crystal display device according to the present invention, it is preferable that the edge of the reflection layer at the transmissive display region side and the edge of the inclined region at the reflective display region side be formed in substantially the same position in the display regions in plan view. According to this construction, it is possible to enlarge the reflective display region to the maximum, thereby increasing the aperture ratio of the liquid crystal display device.

Next, in the liquid crystal display device according to the present invention, it is preferable that the reflection layer have fine irregularities for scattering light. According to this construction, it is possible to scatter and reflect the external light incident into the reflection layer. As a result, it is possible to increase the reflection luminance in the frontal direction of the liquid crystal display device, which is the most popular direction that users are located, and to reduce the reflection luminance to the regularly reflection direction, thereby improving the visibility of the liquid crystal display device.

Further, it is preferable that a wiring line connected to the switching element, and the capacitive electrode or the capacitive line be formed in the same layer. According to this construction, it is possible to make the manufacturing process efficient. As a result, it is possible to reduce the number of man-hours, thereby lowering the manufacturing cost.

Further, it is preferable that the switching element be a TFT element, the wiring line be a data line or a scanning line connected to the TFT element, and the data line or scanning line, and the capacitive electrode or capacitive line be formed in the same layer. According to this construction, since the scanning line or the capacitive line is formed in the same layer. As a result, it is possible to reduce the manufacturing cost even in the liquid crystal display device provided with the TFT element as a switching element.

Next, in the liquid crystal display device according to the present invention, it is preferable that the capacitive electrode or capacitive line which is formed in the same layer as the wiring line connected to the switching element be made of the same material as the wiring line. According to this construction, it is possible to manufacture the wiring line, and the capacitive electrode or capacitive line efficiently. As a result, it is possible to further reduce the manufacturing cost.

Next, a method for manufacturing a liquid crystal display device according to the present invention is a method for manufacturing the above-mentioned transflective liquid crystal display device, and can include forming the wiring line connected to the switching element in the same layer as the capacitive electrode or capacitive line.

According to the manufacturing method above mentioned, it is possible to realize the efficient manufacturing process and to reduce the manufacturing cost, in manufacturing the liquid crystal display device of the present invention that can obtain a high contrast display in both the transmissive display and the reflective display.

Next, in the manufacturing method according to the present invention, the wiring line may be made of the same material as the capacitive electrode or capacitive line. According to this construction, it is possible to further reduce the manufacturing cost.

Next, the present invention provides an electronic apparatus having the previously described liquid crystal display device. The corresponding electronic apparatus have a display part to allow a high-contrast display with excellent visibility in both the reflective/transmissive displays.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Hereinafter, embodiments of the present invention will be described with reference to the drawings.

Figure 1:
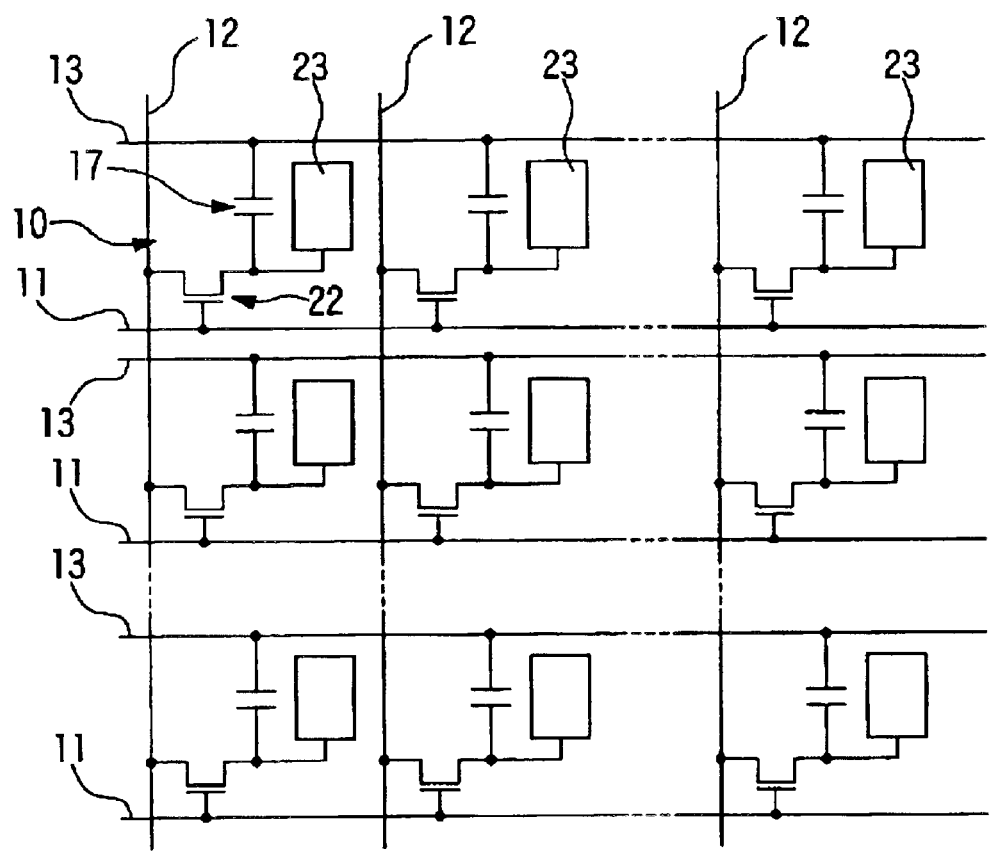
FIG. 1 is an explanatory view illustrating a wiring structure of a liquid crystal display device of an embodiment of the present invention.
Figure 2:
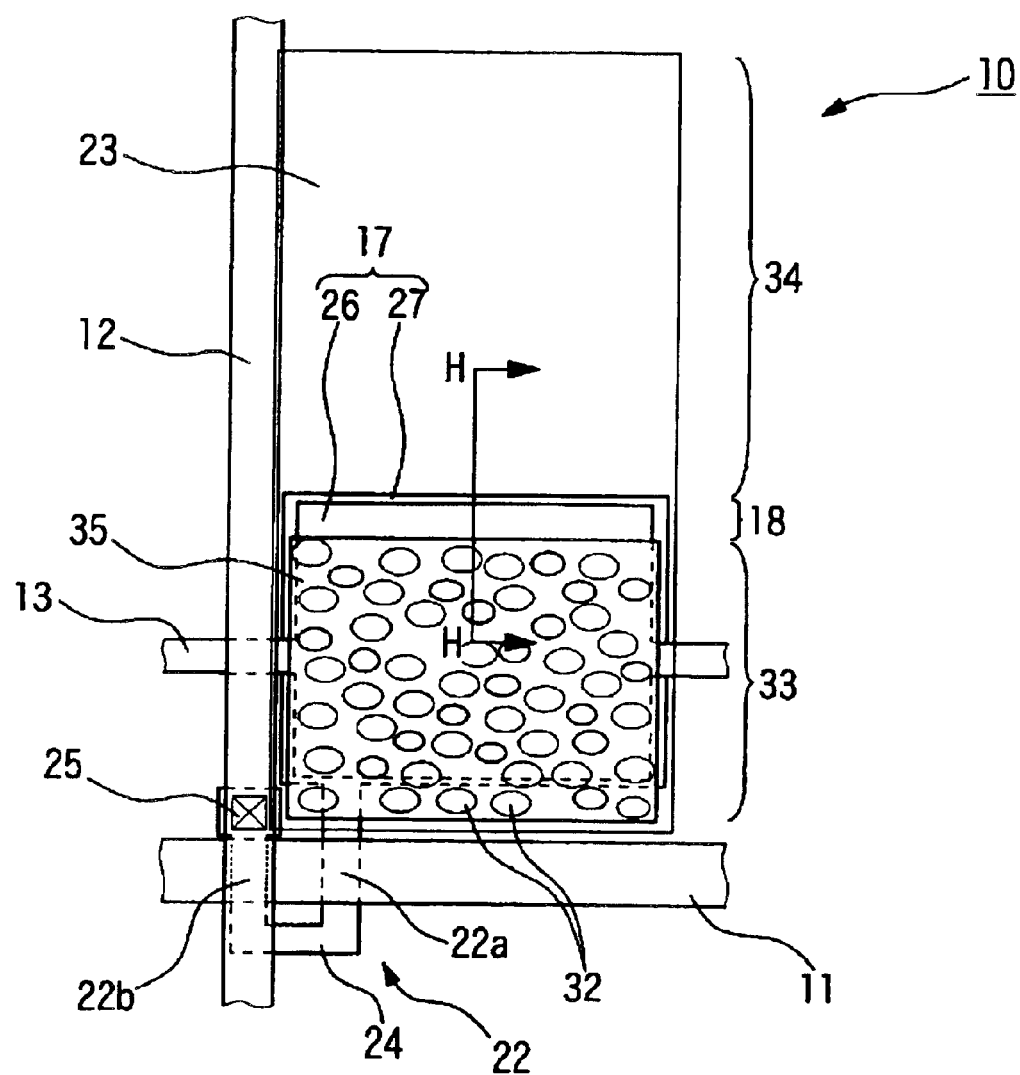
FIG. 2 is a plan view of a construction of one dot region of the liquid crystal display device shown FIG. 1.
Figure 3:
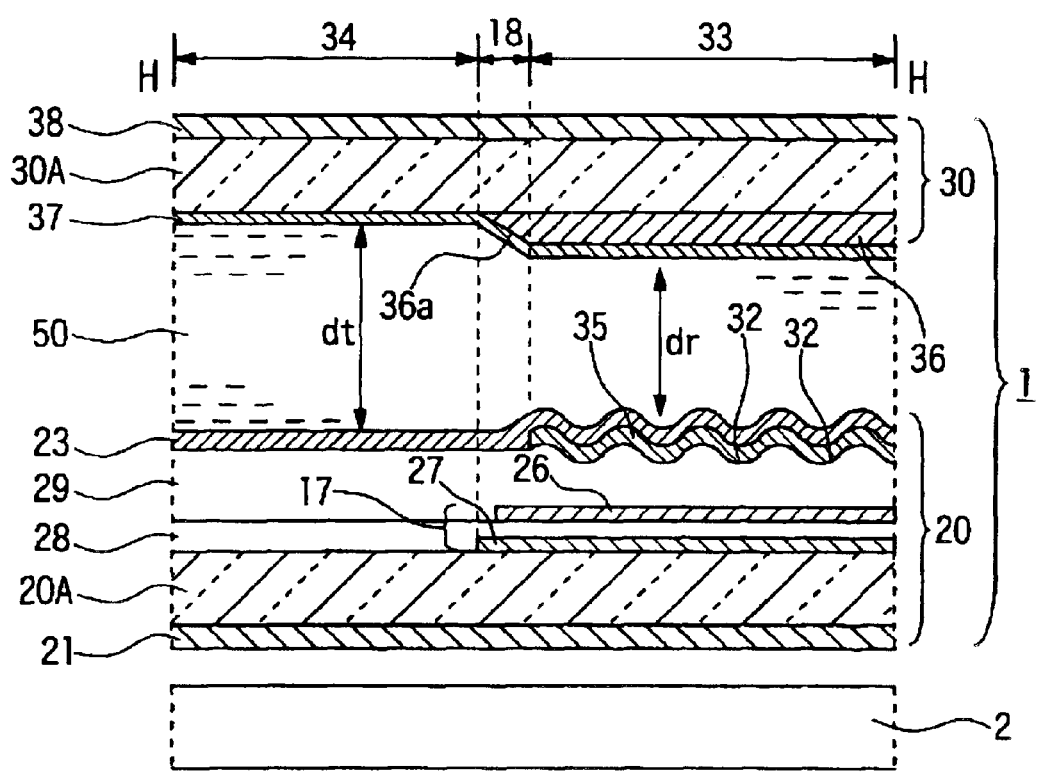
FIG. 3 is a cross-sectional view taken along the line H—H shown in FIG. 2.

FIG. 1 is an explanatory view illustrating an exemplary wiring structure of a plurality of pixels, which are formed in a matrix, constituting an active matrix type liquid crystal display device, according to an embodiment of the present invention. FIG. 2 is a plan view of a construction of a dot region 10 shown in FIG. 1, when seen from the display surface side. FIG. 3 is a cross-sectional view taken along the line H—H shown in FIG. 2. As shown in FIG. 2 and FIG. 3, the liquid crystal display device of this embodiment is a transflective liquid crystal display device comprising a liquid crystal panel 1 having a reflective display region 33 and a transmissive display region 34 in one dot region, and an inclined region 18 between the display regions 33 and 34, and a backlight (illuminator) 2 arranged on the backside thereof.

As shown in FIG. 1, the liquid crystal display device of this embodiment is constructed such that a plurality of scanning lines 11, a plurality of data lines extending in the direction which intersects the scanning lines 12, and capacitive lines 13 extending parallel to the respective scanning lines 11 are wired, respectively. Dot regions 10 are provided around respective intersections between the scanning lines 11 and the data lines 12. Pixel electrodes 23 and pixel switching TFT elements 22 are formed in the dot regions. The data lines 12 to which image signals are supplied are electrically connected to the source regions of the TFT elements 22. The scanning lines 11 are electrically connected to gate electrodes of the TFT elements 22. Further, the pixel electrodes 23 are electrically connected to the drains of the TFT elements 22. The TFT elements 22 are switched by scanning signals supplied from the scanning lines 11, and thus image signals supplied from the data lines 12 are written in the pixel electrodes 23 at a predetermined timing, so that the image signals are held between the pixel electrodes 23 and counter electrodes which oppose each other interposing the liquid crystal layer therebetween. In order to prevent the image signals written in the pixel electrodes 23 from leaking, storage capacitors 17 are added parallel to the pixel electrodes 23, and one electrode constituting the storage capacitor 17 is electrically connected to the capacitor line 13.

Next, referring to FIG. 2 and FIG. 3, the detailed construction of the dot region 10 shown in FIG. 1 will be described.

As shown in FIG. 2, a light transmissive pixel electrode 23 having a substantially rectangular shape in plan view and a reflection layer 35 which overlaps a part of the pixel electrode 23 in plan view are formed in the dot region 10. The region where the reflection layer 35 is formed constitutes the reflective display region 33, and the transmissive display region 34 above the reflective display region 33 in the drawing is a light transmissive region in the region where the pixel electrode 23 is formed. A rectangular electrode part 26 constituting the capacitive line 13, and a rectangular capacitive electrode 27 are formed under the reflection layer to face each other. The electrode part 26 partially protrudes further toward the transmissive display region 34 than the reflection layer 35 in plan view, and the capacitive electrode 27 partially protrudes further towards the transmissive display region 34 than the electrode part 26. Also, in plan view, a region between the reflective display region 33 and the transmissive display region 34 constitutes the inclined region 18, and the capacitive electrode 27 and the electrode part 26 are formed so as to two-dimensionally overlap the inclined region 18.

Further, in the dot region 10, the scanning line 11 and the data line 12 are provided along vertical and horizontal boundaries, and the TFT element 22 is formed around the intersection between the data line 12 and the scanning line 11. The TFT element 22 is formed at a TFT formation part 24 which is substantially U-shaped in plan view and is a part of a semiconductor layer. The rectangular capacitive electrode 27 extends to one end of the U-shaped TFT formation part 24 to constitute the semiconductor layer along with the TFT formation part 24.

Also, the TFT element 22 according to this embodiment, is a so-called dual gate TFT element in which channel regions 22a and 22b are formed at two positions where the substantially U-shaped TFT formation part 24 and the scanning line 11 intersect each other in plan view. A contact hole 25 is formed at an end of the TFT formation part 24 along the data line 12. The data line 12 is electrically connected via the contact hole 25 to the source of the TFT element 22. The other end of the TFT formation part 24, opposite to the contact hole 25, is used as the drain of the TFT element 22. A contact hole (not shown) is formed around a connection part of the TFT formation part 24 with the capacitive electrode 27. The drain of the TFT element 22 is electrically connected via this contact hole to the pixel electrode 23.

Meanwhile, in the cross-sectional view shown in FIG. 3, the liquid crystal display device of this embodiment comprises a liquid crystal panel 1 roughly constituted of an array substrate 20 and a counter substrate 30 arranged to face each other, and a liquid crystal layer 50 interposed between these substrates 20, 30, and a backlight 2 which is arranged on the outer surface side of the lower substrate 20 of the liquid crystal panel 1. The array substrate 20 has a transparent substrate 20A made of glass, plastics, resin film, and the like. The capacitive electrode 27, a first interlayer insulating film 28 for covering the capacitive electrode 27, the electrode part 26, a second interlayer insulating film 29 for covering the electrode part 26, the reflection layer 35 and the pixel electrode 23 are formed at the inner surface side (at the side of a liquid crystal layer 50).

The capacitive electrode 27 and the electrode part 26 are formed in a position opposed to each other, to form the storage capacitor 17 by using the first interlayer insulating film 28 as an insulating layer. The reflection layer 35 is formed on the second interlayer insulating film 29, above the electrode part 26. Further, the pixel electrode 23 is formed on the second interlayer insulating film 29, covering the reflection layer 35. Fine concave parts 32 are formed on the surface of the second interlayer insulating film 29 in the region where the reflection layer 35 is formed.

Further, a polarizing plate 21 is provided on the outer surface side of the substrate 20A.

The counter substrate 30 has a transparent substrate 30A made of glass, plastics, resin film and the like. At the inner surface side of the substrate 30A (at the side of the liquid crystal layer 50), a resin layer 36 is partially provided in each dot region 10 and a counter electrode 37 made of a transparent conductive material such as an ITO is provided to cover the resin layer 36. A polarizing plate 38 is provided at the outer surface side of the substrate 30A.

The resin layer 36 is formed at a position corresponding to the reflective display region 33 in the dot region 10. The above resin layer 36 adjusts the thickness dr of the liquid crystal layer in the reflective display region 33 and the thickness dt of the liquid crystal layer in the transmissive display region 34, allowing a high-luminance display to be performed in both the reflective display and the transmissive display. Further, the resin layer 36 has an inclined part 36a which is inclined with respect to the substrate 30A at an end thereof at the transmissive display region 34 side. In the present specification, the region corresponding to the inclined part 36a in plan view is referred to as an inclined region 18. Further, although not shown, an alignment film is provided on the pixel electrode 23 and the counter electrode 37 to cover these electrodes.

The liquid crystal display device of this embodiment with the above construction is adapted to reflect external light by means of the reflection layer 35 in the reflective display region 33 to perform a reflective display under the environment capable of utilizing the external light as in the bright outdoors, whereas it is adapted to perform a transmissive display for transmitting the light exiting from the backlight 2 under the environment in which it is difficult to utilize the external light.

In the liquid crystal display device of this embodiment, the inclined part 36a and the region where the reflection layer 35 is formed are arranged not to overlap each other in plan view, while the capacitive line 27 extends to an edge of the inclined part 36a at the transmissive display region 34 side. Further, an end of the electrode part 26 at the transmissive display region 34 side is arranged within the inclined region 18.

The capacitive electrode 27, as described above, shares the same semiconductor layer as the TFT formation part 24 where the TFT element 22 is formed. In the liquid crystal display device of this embodiment, the capacitive electrode 27 is made of a poly-silicon layer. Further, the electrode part 26 forms a part of the capacitive line 13, and is made of one or more types of materials selected from metal material (for example, Cr, Ta, Ti, Al, alloy thereof, and the like) and poly silicon. However, in the case that the capacitive electrode 27 is made of material having a light-shielding property and the capacitive electrode 27 protrudes further toward the transmissive display region 34 than the electrode part 26, the forming material thereof is not limited to the above-exemplified materials, but any material having light-emitting properties may be used.

By the above-mentioned arrangement, the liquid crystal display device of this embodiment can obtain a high contrast display in both the reflective display and the transmissive display. In other words, the inclined region 18 shown in FIG. 3 is a region where the thickness of the liquid crystal layer 50 varies continuously from the thickness dt of the liquid crystal layer to the thickness dr of the liquid crystal layer. Further, the inclined region 18 may be a poor display portion because disorder occurs in alignment of the liquid crystal molecules. In particular, the inclined region 18 causes the contrast to greatly deteriorate during dark display due to the leakage of light. Therefore, in the liquid crystal display device of this embodiment, firstly, the reflection layer 35 is formed outside the inclined region 18 to exclude the influence of any poor display resulting from the inclined region 18 on the reflective display, and secondly, the capacitive electrode 27 under the reflection layer 35 (on the side of the substrate 20A) is extended to the position where the capacitive electrode 27 overlaps the inclined region 18 to prevent the light incident from the backlight 2 from entering the inclined region 18. As a result, it is possible to prevent influence on the transmissive display due to any poor display in the inclined region 18.

Although in FIG. 3 the capacitive electrode 27 is constructed to extend from the reflective display region 33 to the edge of the inclined region 18 at the transmissive display region 34 side, the capacitive electrode 27 may be formed to protrude further than the edge of the inclined region 18 at the transmissive display region 34 side. In this case, the edge of the capacitive electrode 27 forms the edge of the transmissive display region 34 at the reflective display region 33 side. However, in order to increase the aperture ratio of the dot region 10, it is preferable that the edge of the capacitive electrode 27 be formed to be substantially at the same position as the edge of the inclined region 18 on the side of the transmissive display region 34 in plan view.

Further, although FIG. 2 and FIG. 3 shows that the capacitive electrode 27 is formed to protrude further toward the transmissive display region 34 than the electrode part 26 of the capacitive line 13, the edge of the electrode part 26 at the transmissive display region side and the edge of the capacitive electrode 27 at the transmissive display region side may be substantially at the same position in plan view, or the electrode part 26 may be arranged to protrude further toward the transmissive display region 34 than the capacitive electrode 27. In these cases, the edges of the capacitive electrode 27 and/or the electrode part 26 on the side of transmissive display region 34 are arranged toward the transmissive display region 34 from the inclined region 18.

Further, the capacitive electrode 27 or electrode part 26, in plan view, has only to be arranged to overlap at least the edge of the reflection layer 35 on the side of the transmissive display region 34 and overlap the inclined region 18. Thus, to the capacitive electrode 27 or electrode part 26 may be formed substantially in a strip shape along the inclined region 18. In this case, it is possible to cause the light from the backlight 2 to enter the back side of the reflection layer 35. Thus, the light reflected from the reflection layer 35 may be returned to the backlight 2 side for reuse, thereby increasing the luminance of the transmissive display.

Although in the above embodiment, as shown in FIG. 2, the case has been described that the inclined region 18 is formed to transverse the dot region 10 in a horizontal direction of the drawing, it should be understood that the liquid crystal display device according to the present invention is not limited to this construction, and the inclined region 18 can have various constructions depending on in which region of the dot region the reflection layer 35 is formed. For example, in the case that the reflection layer is formed substantially in the center of the pixel electrode 23 shown in FIG. 2, the inclined region 18 is formed substantially in a frame shape to surround the reflection layer. Also, the capacitive electrode 27 and the electrode part 26 are formed to protrude from the reflection layer along the substantially frame-shaped inclined region.

Although it has been described in the above embodiment that the resin layer 36 for adjusting the thickness of the liquid crystal layer in the reflective display region 33 is formed on the counter substrate 30, it should be understood that the resin layer 36 partially provided in the dot region 10 may be provided on the array substrate 20. The liquid crystal display device with such a construction is shown in FIG. 4, and will be described below.

Figure 4:
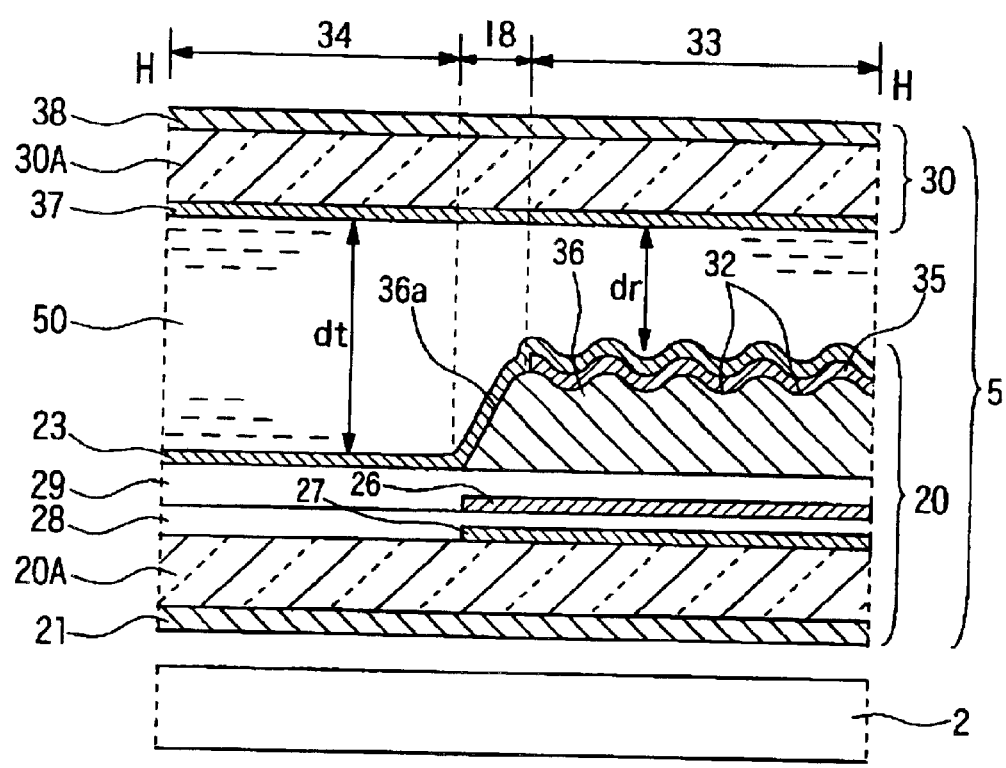
FIG. 4 illustrates an example of another construction of the liquid crystal display device according to the present invention.
Figure 5:
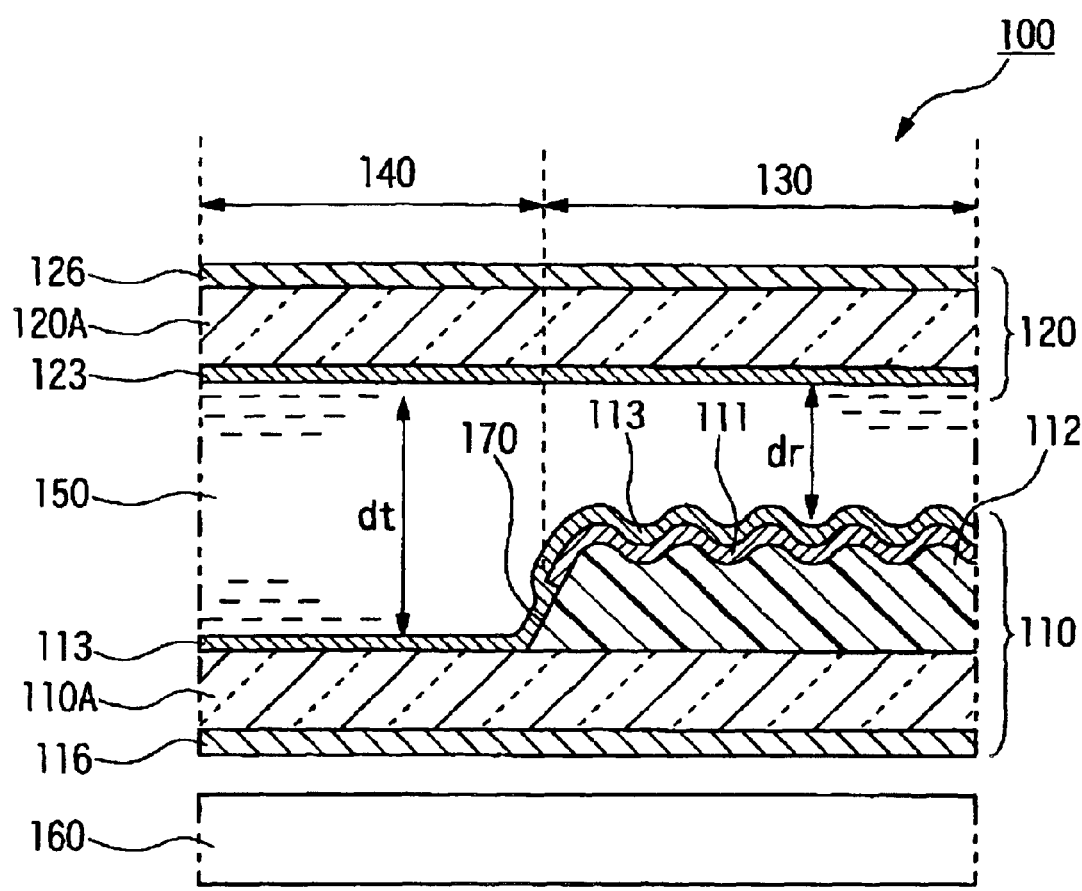
FIG. 5 is a cross-sectional view of a construction of a conventional transflective liquid crystal display device.

FIG. 4 illustrates a liquid crystal display device with a liquid crystal panel 5 in which the resin layer 36 is formed on the inner surface of the array substrate 20. The planar construction of this liquid crystal display device is similar to construction shown in FIG. 2. Further, the construction of the array substrate 20 and the counter substrate 30 constituting the liquid crystal panel 5 is similar to a cross-sectional construction shown in FIG. 3 except for the position of the resin layer 36. In FIG. 3 and FIG. 4, elements given same reference numerals have equivalent constructions.

In the array substrate 20 of the liquid crystal display device 5 shown in FIG. 4, the capacitive electrode 27, the first interlayer insulating film 28, the electrode part 26, and the second interlayer insulating film 29 are laminated on the inner surface of the transparent substrate 20A in that order, and the resin layer 36 is formed substantially at the same position as the electrode part 26 and the capacitive electrode 27 in plan view. The plurality of fine concave parts 32 are formed on the upper surface of the resin layer 36 in the drawing (at the liquid crystal layer 50 side), the reflection layer 35 is film-formed thereon, and the pixel electrode 23 is film-formed to cover the reflection layer 35 and the resin layer 36. The polarizing plate 21 is arranged on the outer surface side of the transparent substrate 20A.

Further, the counter substrate 30 can include the transparent substrate 30A, the counter electrode 37 formed on the entire inner surface side of the transparent substrate 30A, and the polarizing plate 38 arranged on the outer surface side of the substrate 30A.

In the liquid crystal panel 5 with the above construction, an inclined part 36a is formed on the resin layer 36, which is partially formed on the second interlayer insulating film 29, at the transmissive display region 34 side. The region corresponding to the inclined part 36a in plan view is referred as the inclined region 18. Further, the reflection layer 35 on the resin layer 36 is formed such that the edge of the reflection layer 35 is arranged outside the inclined region 18. The electrode part 26 and the capacitive electrode 27 are formed to extend from the reflection layer 35 side to the edge of the inclined region 18 on the side of transmissive display region 34. In other words, the inclined region 18, the reflective display region 33, and the transmissive display region 34 are constructed so as not to overlap each other in plan view. The liquid crystal display device of this construction allows a high-contrast display to be performed in both the reflective display and the transmissive display, similarly to the liquid crystal display device shown in FIG. 2 and FIG. 3.

Now, examples of electronic apparatuses comprising the liquid crystal display device of the above embodiment will be described.

Figure 6A:
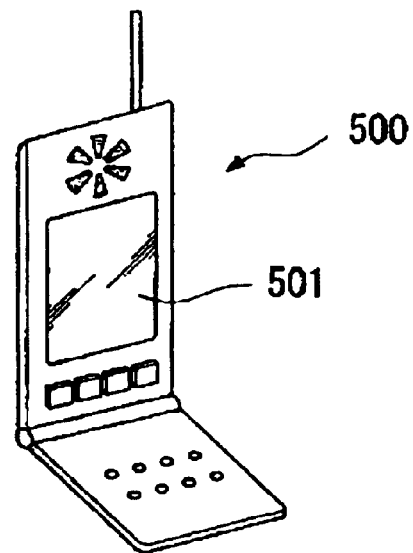
FIG. 6(a) to FIG. 6(c) are perspective construction views illustrating examples of electronic apparatus according to the present invention.

FIG. 6(a) is a perspective view illustrating an example of a mobile phone. In this drawing, reference numeral 500 denotes a main body of the mobile phone, and reference numeral 501 denotes a display part using the liquid crystal display device of the above embodiment.

Figure 6B:
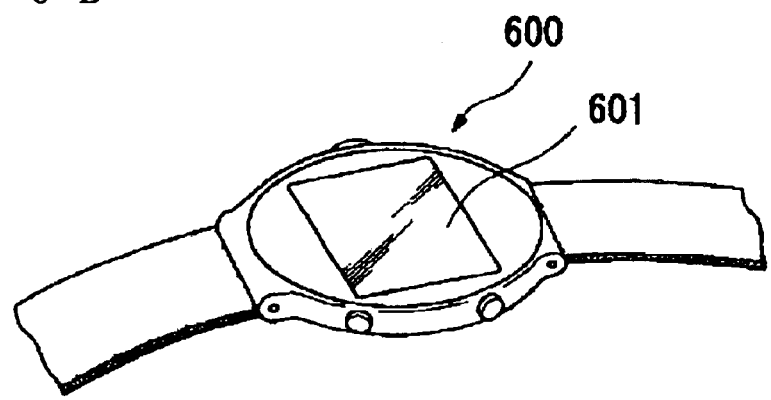

FIG. 6(b) is a perspective view illustrating an example of a wristwatch-type electronic apparatus. In this drawing, reference numeral 600 denotes a main body of the watch. Reference numeral 601 denotes a display part using the liquid crystal display device of the above embodiment.

Figure 6C:
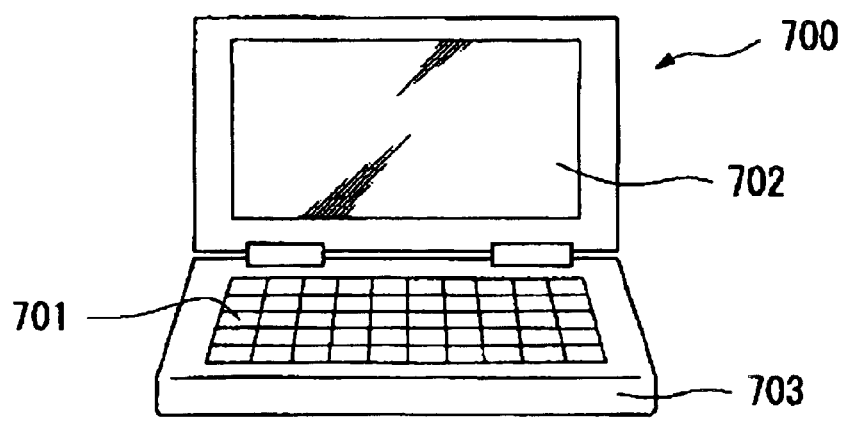

FIG. 6(c) is a perspective view illustrating an example of a portable information processing apparatus such as a word processor or a personal computer. In this drawing, reference numeral 700 denotes an information processing apparatus, reference numeral 702 denotes an input unit, such as a keyboard, reference numeral 704 denotes a main body of the information processing apparatus, and reference numeral 706 denotes a display part using the liquid crystal display device of the above embodiment.

The respective electronic apparatuses shown in FIG. 6 can include the liquid crystal display device according to the above embodiment in their display part. As a result, it is possible to obtain a high contrast display with excellent visibility in both the reflective display utilizing external light and the transmissive display utilizing light from the backlight.

As described above in detail, the present invention provides a transflective liquid crystal display device that can include a liquid crystal layer interposed between an upper substrate and a lower substrate which oppose each other, a reflective display region and a transmissive display region provided in one dot region, the reflective display region and the transmissive display region having different liquid crystal layer-thicknesses, and a reflection layer provided in the reflective display region of the lower substrate. There can be provided in the dot region, a pixel electrode, a switching element for driving the pixel electrode, a capacitive electrode, a capacitive line arranged to oppose the capacitive electrode via an insulating layer, and an inclined region provided between the reflective display region and the transmissive display region, the thickness of the liquid crystal layer in the inclined region varying continuously. In the display regions within the dot region, an edge of the reflection layer at the transmissive display region side is arranged outside the inclined region, and the capacitive electrode or the capacitive line is arranged at a position where it overlaps the inclined region in plan view. Thus, the inclined region, which may be a poor display portion, can be excluded from both the reflective display region and the transmissive display region. As a result, it is possible to obtain a high-contrast display with excellent visibility in both the reflection/transmissive displays.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing for the spirit and scope of the invention.

What is claimed is:

1. A transflective liquid crystal display device, comprising:
    a liquid crystal layer interposed between an upper substrate and a lower substrate which oppose each other;
    a reflective display region and a transmissive display region provided in one dot region, the reflective display region and the transmissive display region having different liquid crystal layer-thickness; and
    a reflection layer provided in the reflective display region of the lower substrate, there being provided in the dot region,
    a pixel electrode,
    a switching element that drives the pixel electrode,
    a capacitive electrode coupled to the pixel electrode,
    a capacitive line arranged to oppose the capacitive electrode with an insulating layer therebetween, and
    an inclined region provided between the reflective display region and the transmissive display region, the thickness of the liquid crystal layer in the inclined region varying continuously, and in the display regions within the dot region, an edge of the reflection layer at the transmissive display region side being arranged outside the inclined region, and the capacitive electrode or the capacitive line being arranged at a position where it overlaps the inclined region in plan view.

2. The transflective liquid crystal display device according to claim 1, the edge of the reflection layer at the transmissive display region side and the edge of the inclined region at the reflective display region side being formed in substantially a same position in the display regions in plan view.

3. The transflective liquid crystal display device according to claim 1, the reflection layer having fine irregularities that scatter light.

4. The transflective liquid crystal display device according to claim 1, a wiring line coupled to the switching element, and the capacitive electrode or the capacitive line being formed in the same layer.

5. The transflective liquid crystal display device according to claim 4, the switching element being a TFT element, and the wiring line being used as a data line or a scanning line connected to the TFT element, and the data line or scanning line, and the capacitive electrode or capacitive line being formed in a same layer.

6. The transflective liquid crystal display device according to claim 4, the capacitive electrode or capacitive line which is formed in the same layer as the wiring line connected to the switching element being made of the same material as the wiring line.

7. The transflective liquid crystal display device according to claim 2, the reflection layer having fine irregularities that scatter light.

8. The transflective liquid crystal display device according to claim 2, a wiring line coupled to the switching element, and the capacitive electrode or the capacitive line being formed in the same layer.

9. The transflective liquid crystal display device according to claim 3, a wiring line coupled to the switching element, and the capacitive electrode or the capacitive line being formed in the same layer.

10. An electronic apparatus comprising the transflective liquid crystal display device according to claim 1.

11. A method for manufacturing the transflective liquid crystal display device according to claim 1, the method comprising forming a wiring line connected to the switching element in a same layer as the capacitive electrode or capacitive line.

12. The method for manufacturing a transflective liquid crystal display device according to claim 11, the capacitive electrode or capacitive line being made of the same material as the wiring line.

* * * * *